July 7, 1925.  S. LANDES  1,545,189
CULTIVATOR
Filed Nov. 17, 1924
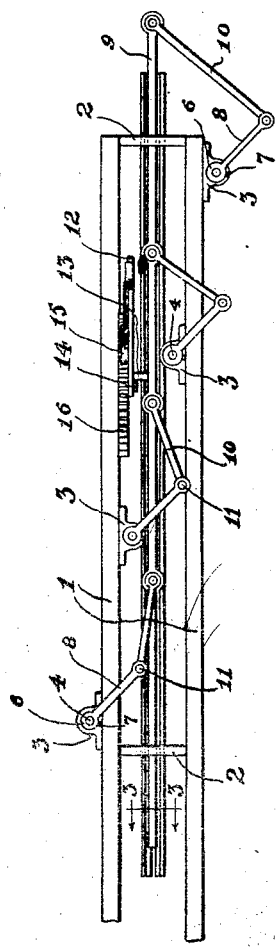
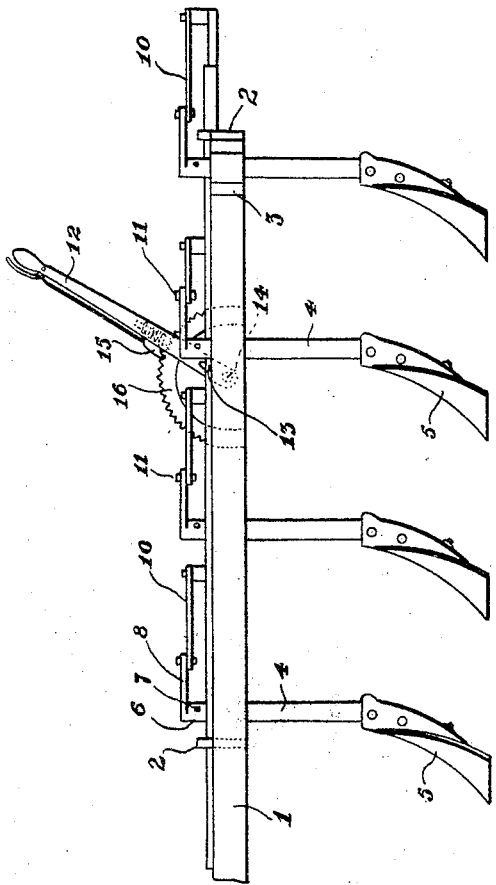
Inventor
Solomon Landes
By Frease and Bond
Attorneys Patented July 7, 1925.

1,545,189

UNITED STATES PATENT OFFICE.

SOLOMON LANDES, OF CANTON, OHIO.

CULTIVATOR.

Application filed November 17, 1924. Serial No. 750,345.

*To all whom it may concern:*

Be it known that I, SOLOMON LANDES, a citizen of the United States, residing at Canton, in the county of Stark and State of Ohio, have invented certain new and useful Improvements in Cultivators, of which the following is a specification.

This invention relates to agricultural implements such as cultivators, and more particularly to means for adjusting the shovels.

In the usual form of cultivator, the shovels are stationary, causing the soil to be thrown continually in the same direction. However, owing to the unevenness of the ground, it has been found that while in some cases, especially upon level ground, good results may be obtained by leaving the shovels in their original positions, it is frequently desirable or necessary to change the position of the shovels when working on the side of a hill or the like.

The object of the present invention is to provide means by which the shovels of a cultivator may be quickly and easily adjusted to give the best results under all conditions, without stopping the travel of the machine, means being provided whereby the several shovels upon each side of the cultivator may be simultaneously adjusted without affecting the shovels at the other side of the cultivator, and may be locked in their adjusted position so as to be prevented from accidental movement.

An embodiment of the invention is illustrated in the accompanying drawing, in which—

Figure 1 is a side elevation of a gang of shovels removed from the cultivator, showing the improved adjusting means;

Fig. 2, a top plan view of the same; and

Fig. 3, a section on line 3—3, Fig. 2.

Similar numerals refer to similar parts throughout the drawing.

The beams 1 are spaced apart as by the spacing blocks 2, and may be supported at their forward ends from the cultivator in any well known manner.

The beams are provided at spaced intervals with the bearing blocks 3, preferably located in staggered relation, as best shown in Fig. 2, the vertical shanks 4 of the shovels 5 being journaled in said blocks.

These shovels and shanks may be of any usual construction and for the purpose of adjusting the shovels in each gang simultaneously, the mechanism to which the present invention pertains is arranged to be applied to the gang in the form of an attachment or accessory.

A collar 6 is arranged to be fitted over the upper end of each shovel shank 4 and fixed thereto as by a set screw 7, a rocker arm 8 being rigidly formed upon each of said collars.

A bar 9 is slidably mounted through the spacing blocks 2 and carries a plurality of links 10, each of which is pivotally connected to one of the rocker arms 8, as shown at 11.

The sliding bar 9 is operatively connected to the operating lever 12, as shown at 13, said lever being pivotally mounted upon one of the beams 1, as indicated at 14, and provided with a manually operated pawl 15 for engagement with the toothed segment 16, for the purpose of holding the lever in adjusted position.

From the above, it will be readily seen that the device may be easily and quickly applied to any well known form of cultivator without making any considerable change in the construction of the same.

The operating levers will be located in a position where they may be easily manipulated by the driver and either gang of shovels may be adjusted without affecting the operation of the other gang, so that the soil turned up and thrown to one side by either gang may be so disposed as to produce the desired growth of the plants under cultivation, without any of the disadvantages or damage to the plants which is unavoidable with the use of fixed shovels.

I claim:—

A cultivator gang including a pair of parallel beams, spacing blocks between the beams, a bar slidably mounted through the spacing blocks, bearing blocks mounted in staggered relation upon the beams, shovel shanks rotatably mounted in the bearing blocks, a collar mounted upon each shank and provided with a rigid arm, links pivotally connecting the sliding bar with said arms, an operating lever for moving the bar longitudinally and means for holding the lever in adjusted position.

In testimony that I claim the above, I have hereunto subscribed my name.

SOLOMON LANDES.